(12) United States Patent
Deter et al.

(10) Patent No.: US 7,347,567 B2
(45) Date of Patent: Mar. 25, 2008

(54) ARRANGEMENT FOR PROJECTING AN IMAGE ONTO A PROJECTION SURFACE AND ASSOCIATED TRANSFORMATION LENS SYSTEM

(75) Inventors: Christhard Deter, Gera (DE); Jorg Wunderlich, Brahmenau (DE)

(73) Assignee: JENOPTIK LDT GmbH, Jena (DE)

( * ) Notice: Subject to any disclaimer, the term of this patent is extended or adjusted under 35 U.S.C. 154(b) by 319 days.

(21) Appl. No.: 10/532,454

(22) PCT Filed: Oct. 21, 2003

(86) PCT No.: PCT/EP03/11653

§ 371 (c)(1),
(2), (4) Date: Apr. 22, 2005

(87) PCT Pub. No.: WO2004/039084

PCT Pub. Date: May 6, 2004

(65) Prior Publication Data

US 2005/0264879 A1    Dec. 1, 2005

(30) Foreign Application Priority Data

Oct. 22, 2002   (DE)   ............... 102 49 338

(51) Int. Cl.
*G03B 21/14* (2006.01)
(52) U.S. Cl. ............. 353/79; 359/794; 359/205
(58) Field of Classification Search ............. 353/69, 353/70, 100, 79, 119; 359/793, 794, 799, 359/725, 205, 206
See application file for complete search history.

(56) References Cited

U.S. PATENT DOCUMENTS

| 3,687,530 | A |   | 8/1972  | Watanuki |
|-----------|---|---|---------|----------|
| 4,167,311 | A | * | 9/1979  | Pund ........................... 353/99 |
| 4,297,723 | A | * | 10/1981 | Whitby ....................... 348/36 |
| 5,321,499 | A |   | 6/1994  | Yu et al. |
| 5,442,413 | A | * | 8/1995  | Tejima et al. ................. 353/69 |
| 5,485,225 | A |   | 1/1996  | Deter et al. |

(Continued)

FOREIGN PATENT DOCUMENTS

DE   43 24 849 A1   2/1995

(Continued)

*Primary Examiner*—William C. Dowling
(74) *Attorney, Agent, or Firm*—Patterson, Thuente, Skaar & Christensen, P.A.

(57) ABSTRACT

The invention relates to an arrangement for projecting an image, which is made of pixels, onto a projection surface, including at least one light source whose intensity can be altered and which emits a light beam, also including a deflection device which deflects the light beam onto the projection surface, and a two-stage transformation lens system which is arranged between the deflection device and the projection surface. The invention also relates to optical systems for adjusting the angle of an incident light beam by means of a two-stage transformation lens. The invention includes a transformation lens system is made up of two partial systems having positive refractive power such that when seen in the direction of the propagation of the light, the entrance pupil is arranged in front of the first lens apex of the transformation lens system and the exit pupil of the transformation lens system is arranged between the lens apex of the last lens and the projection surface, and a diaphragm is arranged inside the exit pupil.

13 Claims, 6 Drawing Sheets

U.S. PATENT DOCUMENTS

| | | | |
|---|---|---|---|
| 5,521,646 A | 5/1996 | de Paul Humeau et al. | |
| 5,581,392 A * | 12/1996 | Hayashi | 359/205 |
| 5,592,239 A | 1/1997 | Hara et al. | |
| 5,694,180 A | 12/1997 | Deter et al. | |
| 5,978,132 A * | 11/1999 | Ulrich | 359/355 |
| 6,057,964 A * | 5/2000 | Roeder et al. | 359/618 |
| 6,123,425 A * | 9/2000 | Ohzawa | 353/69 |
| 6,246,527 B1 | 6/2001 | Hayakawa et al. | |
| 6,313,950 B1 | 11/2001 | Hayakawa et al. | |
| 6,607,280 B2 * | 8/2003 | Koyama et al. | 362/601 |
| 7,077,529 B2 * | 7/2006 | Turner et al. | 353/97 |
| 7,159,988 B2 * | 1/2007 | Yatsu et al. | 353/69 |
| 2001/0013977 A1 | 8/2001 | Tadic-Galeb et al. | |

FOREIGN PATENT DOCUMENTS

| | | |
|---|---|---|
| DE | 43 26 899 A1 | 2/1995 |
| DE | 43 24 848 C1 | 3/1995 |
| DE | 195 22 698 A1 | 1/1997 |
| EP | 0 734 184 A2 | 9/1996 |
| JP | 06194599 A | 7/1994 |
| WO | WO 96/12373 | 4/1996 |

* cited by examiner

ARRANGEMENT FOR PROJECTING AN IMAGE ONTO A PROJECTION SURFACE AND ASSOCIATED TRANSFORMATION LENS SYSTEM

FIELD OF THE INVENTION

The invention relates to an arrangement for projection of an image onto a projection surface, which image consists of image points, said arrangement comprising at least one light source, which emits a light bundle and has a variable intensity, and a deflection device, which deflects the light bundle onto the protection surface, comprising two-stage transformation optics between the deflection device and the projection surface.

The invention further relates to optical systems for transforming the angle of an incident light bundle, comprising two-stage transformation optics.

BACKGROUND OF THE INVENTION

Projection systems for projecting color images are known from the prior art. As image sources, for example, computer-generated images or video sources are available. In this connection, different projection technologies are applied.

DE 43 26 899 A1 describes a projection system using three CRTs, one respectively for each of the three primary colors of red, green and blue, so as to generate color images. The images generated on the surfaces of each of said CRTs are respectively imaged onto a projection surface by an imaging optical system and superimposed there.

A viewer standing at a point where he can see the light exiting from the projector (which is already the case when viewing the projector from the side), recognizes three color surfaces, which are brighter or darker depending on the image content.

U.S. Pat. No. 5,321,499 A also describes a projection system comprising three CRTs, whose generated three partial images are superimposed by dichroic mirrors, such that only one optical system remains to effect imaging onto the projection surface.

The viewer standing between the projector and the projection surface can see a colored surface on the projector, said surface having a diameter of a few centimeters.

WO 96/12373 A1 uses a projection lamp cooperating with a transilluminated LCD matrix for image modulation in order to generate an image. The LCD matrix is in turn imaged onto the projection surface by an imaging optical system with an aperture whose size is in the order of a few centimeters.

EP 0 734 184 A2 describes a projection system which uses three LCD matrices operating in a reflection mode. This also requires projection optics complying with the laws of imaging, i.e. which have to be dimensioned with a suitably large diameter in order to provide images having a suitable light intensity.

U.S. Pat. No. 5,592,239 A describes a projection assembly using three reflecting mirror matrices for image modulation. In the same manner as in the already described projection methods, an imaging optical system is used for projection onto the projection surface, the free light exit of said system being in the order of between 5 cm and 10 cm.

An entirely different type of image-generation is described in DE 43 24 849 A1, wherein a projection method using a directly writing laser beam is used. In connection with this invention, such projector is referred to as a laser projector. The novel optical system described therein does not serve the purpose of enlarged imaging of an internal, small primary image, generated in the projector, but of increasing or decreasing the angles of deflection of the scanned laser beams in horizontal and vertical directions, which beams enter the optical system.

The technical demands made on the optical system for transforming the angle of deflection are essentially as follows: Angle magnification, depth of focus, geometric and chromatic errors of imaging, transmission. The size of the aperture of the angle transformation optics is typically also in the order of between 5 cm and 10 cm.

DE 195 22 698 A1 describes an optical system, wherein the variation of the angles of deflection can be effected in a continuous manner. In this case, a zoom function is provided with regard to the variation of the angles of deflection. Thus, the image size on the projection surface is variable. The opening of the angle transformation optics is greater than 5 cm in diameter also in this case.

When imaging charts onto an incident-light projection surface using one of the above-described projection systems, the projector is arranged relative to the viewer(s) such that the viewers will not be able to look directly into the imaging optical system. Scattered light exiting from the projector is not perceived and does not interfere with the perception of the image displayed.

Conditions are totally different for projection in a dome, wherein the projectors are arranged within the area of the dome serving as a projecting surface.

Such projection system is described in U.S. Pat. No. 3,687,530 A. Five projectors are arranged below an equatorial plane, each behind the spherical projection surface. Triangular windows are provided in the projection surface which crop the projected partial images such that they are combined on the projection surface to form a homogeneous large image.

U.S. Pat. No. 3,687,530 A remains silent on the size of the triangular opening. According to the laws of enlarging optical imaging and the cropping of the image provided here, however, the opening definitely has to be larger than the clear diameter of the projection optics in at least one direction.

In any case, it is possible here that the viewer may have one or more optical systems in his field of vision from his usual position. When light passes through optics, this will, in any case, generate scattered light, increased by particles of dust and dirt. Said scattered light has an interfering effect on viewing of the projected image. In particular, for image contents including night scenes, i.e. in flight simulation, astronomical projections and the like, such scattered light is found to strongly interfere. The more extensive the dimensions of the lenses are that can be perceived by the eye, the more interference will be caused by the scattered light.

It is the object of the invention to improve a projection arrangement wherein a viewer can perceive the projected light bundle exiting from the projector such that the interferences caused thereby in the perception of the image representation are reduced, if possible.

The object is achieved by an arrangement for projecting an image onto a projection surface, which image is composed of image points, said arrangement comprising at least one light source, which emits a light bundle and has a variable intensity; a deflection device, which deflects the light bundle onto the projection surface; and two-stage transformation optics, which are arranged between the deflection device and the projection surface and consist of two partial systems having positive power of refraction, and wherein the entrance pupil, as seen in the direction of light propagation, is located in front of the lens vertex of the transformation optics, and the exit pupil of the transformation optics is located between the lens vertex of the last lens of the transformation optics and the projection surface, and a stop is arranged in the exit pupil. The position of the exit pupil and the arrangement of the stop therein prevent a viewer from perceiving scattered light. The comparatively small stop aperture serves as a point of passage for the light bundle writing the image. Using the arrangement for projection according to the invention, the size of the light exit opening can be drastically reduced over the prior art. In particular, all scattering surfaces of the optical system for image projection can be arranged outside the field of vision of the viewer.

The solution according to the invention is applicable in any type of projection using a writing light bundle. A light source emitting laser radiation is particularly advantageous. Projectors using laser radiation are also known as laser projectors. Above all, the solution according to the invention provides advantages in those cases where the viewer, in order to view the projected image, has to look in the direction of the projector at the same time.

An advantageous embodiment of the invention consists in that the stop has a clear diameter, which corresponds to a diameter of the incident light bundle divided by an angular magnification of the transformation optics. In addition, a correction factor of between 1 and 1.5 should be considered, in order to safely and completely avoid cropping of the beam at the stop. It is essential that the diameter of the stop decrease proportionally at an angular magnification of >1. At an angular magnification of <1, the diameter of the stop increases proportionally compared to the diameter of the incident light bundle, with the stop aperture being considerably smaller also in these cases than the aperture of a lens according to the prior art. The viewer sees no optical surface and, thus, also no scattered light. As seen in the direction of light propagation, said stop is arranged following the last lens vertex of the transformation optics. Typically, the stop is arranged 1 cm to 50 cm posterior to the last lens vertex, so that nearly all constructional requirements for a projection system can be satisfied. In a different case, the stop can also be applied directly to the surface of the last optical surface of the transformation optics, as seen in the light direction.

In this case, the stop is part of a housing of the transformation optics. The lenses of the transformation optics are mounted within said housing. A mechanical connection to a biaxial deflection device is provided at one end of the housing. The other end of the housing is provided with the stop, which is the light exit for the deflected light bundle. In this case, the distance from the stop to the last lens vertex is advantageously less than 5 cm.

Another embodiment of the invention consists in that the stop is integrated into the surface of a wall and the transformation optics with the respective biaxial deflection device are positioned with respect to the stop in the wall. Thus, the position of the stop in the projection surface is designed such that a minimum possible diameter of the aperture in the projection screen is obtained.

A further embodiment of the invention consists in that one side of the wall forms the projection surface, that the projector with its transformation optics is arranged on an opposite side and the stop is incorporated into the projection surface. This arrangement is convenient, in particular, in a cylinder projection or in a dome projection. In most cases, the comparatively small stop aperture is not perceived at all or perceived only with great difficulty. The image information represented on the projection surface is distorted to the smallest possible extent.

In particular, the transformation optics can be corrected for imaging free from distortion. Depending on the particular application, such correction may be effected, for example, according to the tangential condition, which is described in more detail in DE 43 24 849 A1, or according to the angle condition. The correction according to the angle condition is particularly advantageous in projection onto a cylindrical or spherical projection surface. Thus, for example, in transformation optics for projection in a spherical surface, the transformation optics are embodied such that the entrance angle and the exit angle of the light bundle entering them and exiting from them, respectively, are directly proportional to one another. This means that, in projection from the center of a spherical dome, e.g. from the center of a planetarium, a Cartesian test pattern (chess board) can be projected without geometric distortion.

Further, an optical system for transforming the angle of an incident light bundle is provided, said system comprising two-stage transformation optics, which consist of two partial systems having positive power of refraction, said systems being arranged following each other in the direction of light propagation, wherein the ratio of the refractive powers of the partial systems determines the angular magnification of the deflected light bundle and the arrangement of the lenses in the second partial system is selected such that, as seen in the direction of light propagation, the exit pupil of the transformation optics is located between the lens vertex of the last lens of the transformation optics and the projection surface, and wherein a stop is arranged in the exit pupil. In combination with a stop in the exit pupil, this optical system or the transformation optics, respectively, provide the above-described advantages of the invention.

The optical system or the stop, respectively, may be further embodied in the same manner as in the arrangement according to the invention as described above.

The transformation optics may be corrected for imaging free from distortion. Again, such correction can be effected, for example, according to the tangential condition or according to the angle condition.

Further, an optical system for transforming the angle of an incident light bundle is provided, said system comprising two-stage optics for angle transformation, whose exit pupil is located within the lenses of the optical system, wherein relay optics consisting of two partial systems having positive power of refraction are arranged posterior to the angle transformation optics, as seen in the direction of light propagation, the arrangement of the lenses in the second partial system of the relay optics being selected such that, as seen in the direction of light propagation, an exit pupil of the relay optics is located between the lens vertex of the last lens of the relay optics and the projection surface, and wherein a stop is arranged in the exit pupil of the relay optics.

The relay optics do not change the amount of the angle of the light bundles entering them or exiting from them, but only change its mathematical sign (the original light being laterally inverted and upside down).

The use of the relay optics is particularly advantageous, if existing optics for angle transformation are combined with the relay optics and the stop, such that the above-described advantages of the invention and of its further embodiments are achieved by the combined system.

The two-stage angle transformation optics can be corrected for imaging free from distortion. Depending on the particular application, such correction may be effected, e.g., according to the tangential condition or according to the angle condition.

The optical system or the stop, respectively, may be further embodied in the same manner as in the arrangement according to the invention described above.

BRIEF DESCRIPTION OF THE DRAWINGS

The invention will be described in more detail below with reference to the figures, wherein.

DETAILED DESCRIPTION OF THE INVENTION

Figure 1:
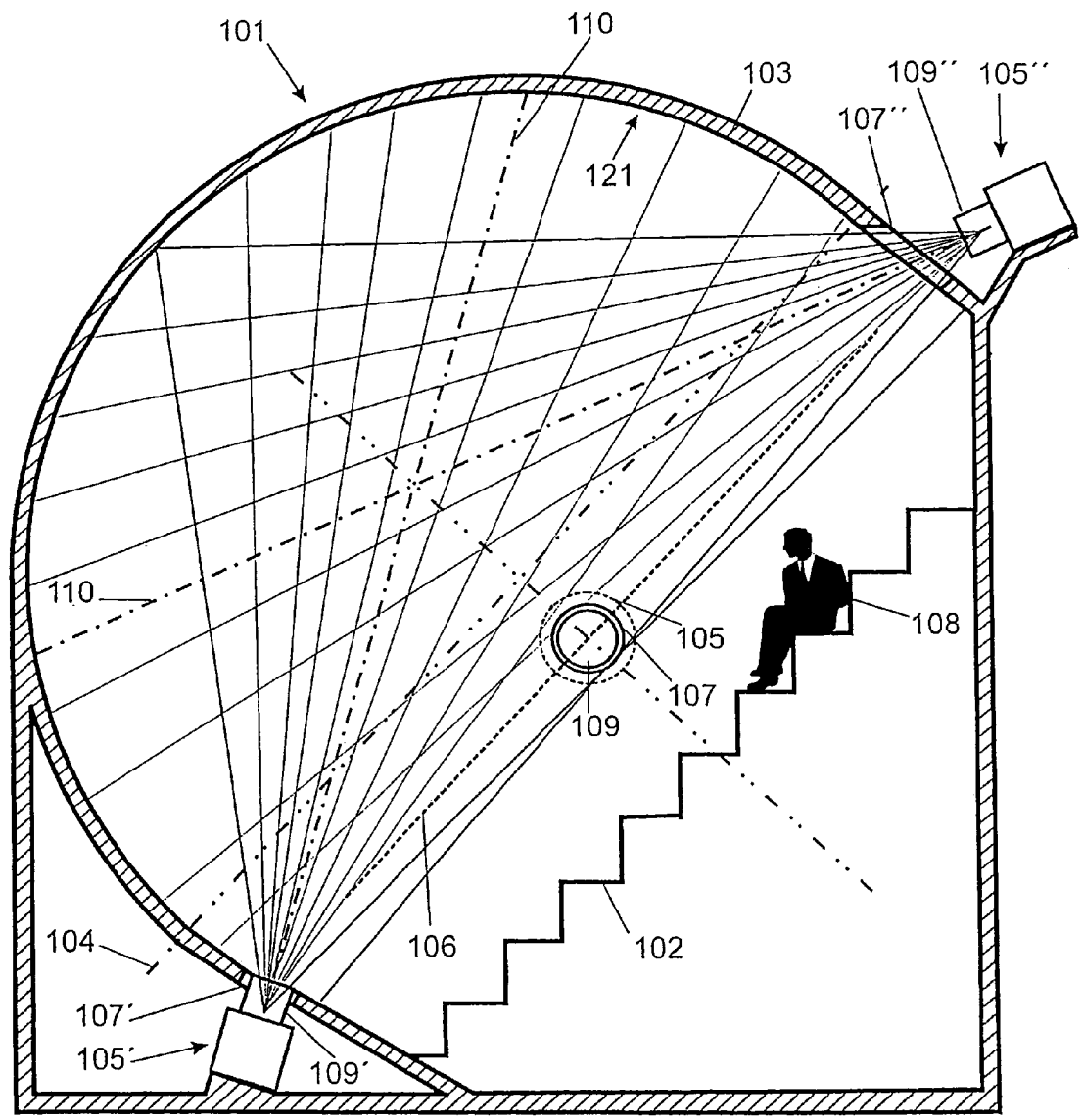
FIG. 1 shows the arrangement of a projection system in a dome according to the prior art.

FIG. 1 shows a projection system for representing an image in a projection dome 101 using four projectors 105 (three of which are shown in the figure) according to the known prior art. The four projectors 105 are laser projectors in the example, each respectively comprising transformation optics 109. They generate four images which are composed on a projection surface 121 of a wall 103 of a dome such that a complete image is generated. The viewer 108 of the image is seated within the projection dome 101 in a viewers' stand 102, for example, below an equatorial plane 104. The projectors 105 are arranged such, relative to the wall 103 of the dome, that they are located below the equatorial plane with an offset of 90° each, behind the wall 103, as seen by the viewer, in a plane 106. In order to allow projection of the images from the location of the projectors 105 into the projection dome 101, breakthroughs 107 are present in the wall 103, which are dimensioned such that no cropping of the image occurs. In the example, one of the projectors 105' is arranged such that its transformation optics 109' protrude into the breakthrough 107' of the wall 103.

With this arrangement of the projectors 105, the viewer 108 viewing the image in the projection dome 101 can look directly at a light exit opening of the transformation optics 109'.

Since, in addition to the projection beams, scattered light is always emitted as well at the light exit opening, the viewer perceives image information which is not present in the actual image at this point of the projection dome.

When viewing the projected image, said scattered light has an interfering effect. This scattered light is found to greatly interfere, in particular, in the case of image contents including night scenes, e.g. in flight simulation, astronomical projections and the like. The more extensive the dimensions of the lenses are which are perceived by the eye of the viewer 108, the more interfering the scattered light will become. The problem is not solved by the possibility of placing the projectors 105 at a greater distance from the wall 103, because this measure is associated with an enlargement of the breakthrough, which is illustrated in FIG. 1 as an example with reference to the projector 105'', with its transformation optics 109'' and the comparatively larger breakthrough 107''.

The same interfering image information is perceived by the viewer at the light exit openings of the transformation optics, when the projectors 105 are placed within the projection dome 101 (not shown). As described, conditions are just as poor in imaging projectors using projection optics, e.g. CRT projectors, LCD projectors, or DMD projectors.

Figure 2:
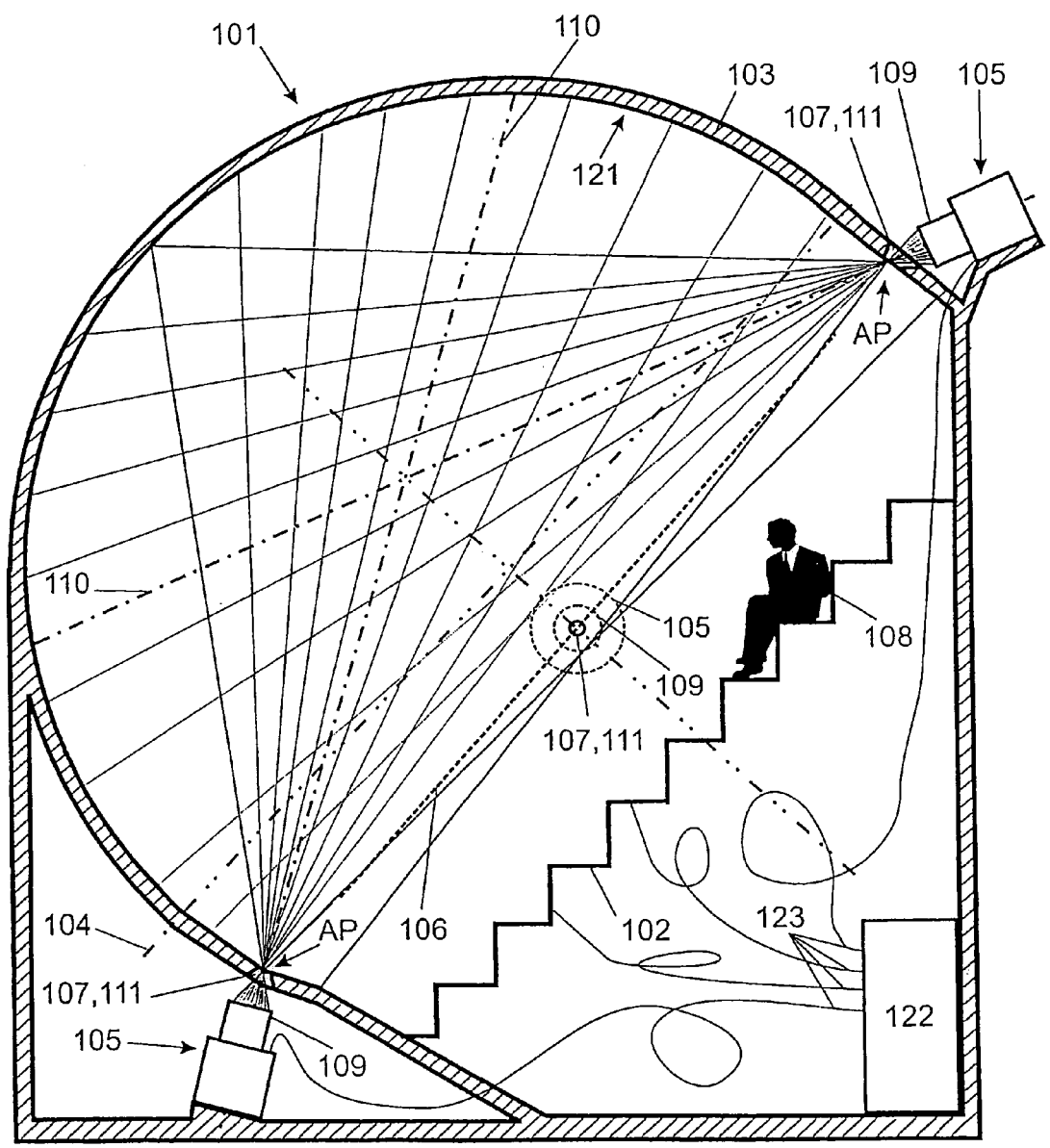
FIG. 2 shows the arrangement of a projection system according to the invention.

FIG. 2 shows the projection system according to the invention for representing an image in the projection dome 101, comprising four projectors 105 (three of which are shown in the figure). Said four projectors 105 are laser projectors, each respectively comprising transformation optics 109 according to the invention. The use of laser projectors, i.e. of projectors using a biaxially deflected light bundle, is a prerequisite allowing the diameter of the breakthroughs 107 in the wall 103 to be minimized. The laser projectors consist of a projector 105 comprising a biaxial deflection device 112 and the transformation optics 109, as well as a light source 122. In the example, a single light source 122 is placed at a distance from the location of the four projectors 105 and is connected to them via electric cables and optically connected to them via light fiber connections 123. Such laser projectors are described, for example, in DE 43 24 848 C1. Using an RGB laser as the light source 122, four spatially combined and intensity-modulated red-green-blue-light bundles are generated and color images are projected by each projector 105, said images being combined on the projection surface 121 to form a complete image.

However, one light source 122 each may also be incorporated into each of the projectors (not shown).

In this case, the projectors 105 are arranged—as seen by the viewer 108—behind the wall 103 of the dome such that an exit pupil AP of each transformation optics 109 is located within the breakthroughs 107. The breakthroughs themselves function here as a stop 111, whose aperture (clear diameter for the beam path of the projection light) is typically within the range of between 1 and 10 mm, depending on the angular magnification and the beam diameter of the incident light bundle 113. In relation to the clear diameter of known projection optics, this is 10 to 100 times smaller. The stop does not provide scattered light so that the viewer 108 looking at the breaktrough 107 will not perceive any light at this location. The breakthrough serving the optical function of a stop also prevents the viewer 108, in his usual position, from seeing the last lens vertex—as seen in the direction of light propagation—of the transformation optics. This is not the case only if the viewer is positioned such that he has his eye point near or in the main projection beam 110 of the projector 105. However, this position is practically excluded due to the risk of health-damaging radiation.

The invention allows to represent an image during projection in which scattered light of the transformation optics neither distorts nor reduces the quality of image representation. This is of importance, in particular, in applications of projection technology in a planetarium or in a simulator for representing night scenes.

Projectors can now also be arranged within the projection dome 101, without the viewer 108 being aware of a noticeable interference in the image information.

Figure 3:
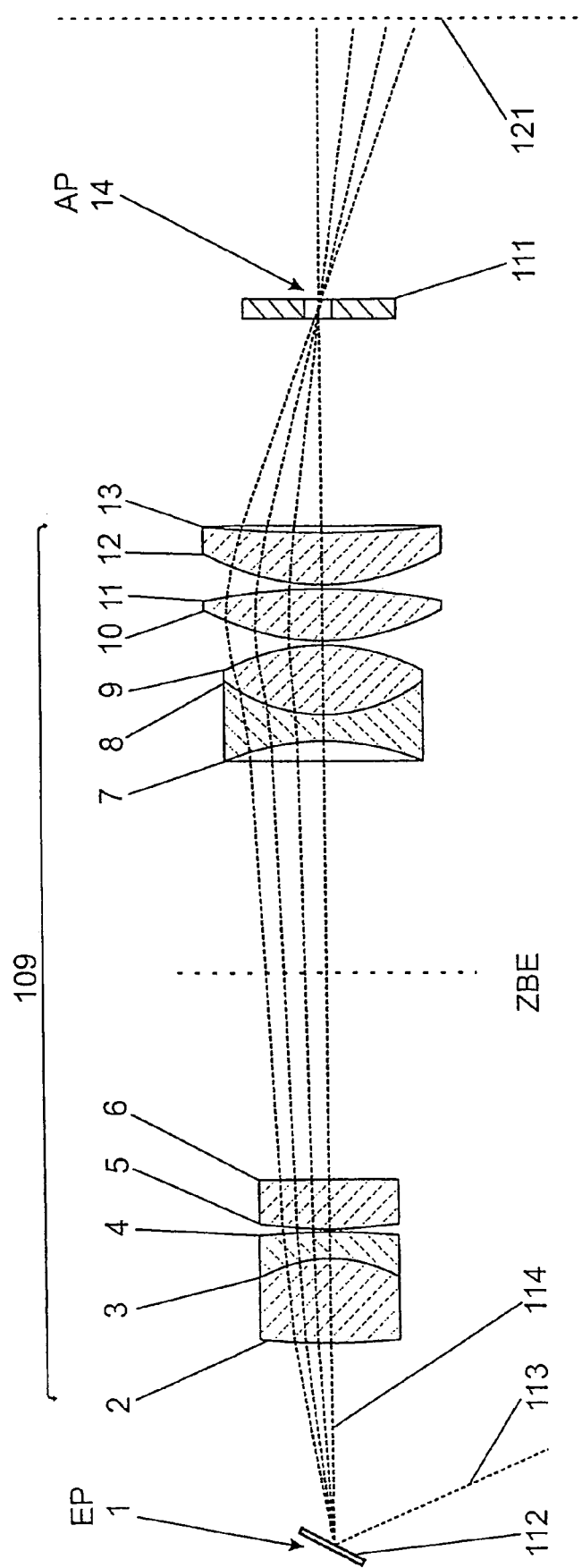
FIG. 3 shows transformation optics according to the invention.

FIG. 3 shows the optical scheme of the transformation optics according to the invention, which are employed in an arrangement according to FIG. 2. Numbers 1 to 14 denote the optical surfaces. A first partial system comprises the optical surfaces 2 to 6, and a second partial system comprises the optical surfaces 7 to 13. For example, transformation optics with an angular magnification of 2 are structured as follows:

| Surface | Radius/mm | Thickness/mm | Glass (n; v) | Remark |
|---|---|---|---|---|
| 1 | ∞ | 40.936 | | Thickness = distance of EP from first lens vertex |
| 2 | 140.69 | 16.74 | 1.589; 61.3 | |
| 3 | −28.62 | 5.23 | 1.672; 32.3 | |
| 4 | −163.91 | 0.52 | | |
| 5 | 93.79 | 9.94 | 1.713; 53.8 | |
| 6 | ∞ | 89.20 | | |
| 7 | −50.16 | 5.44 | 1.717; 29.5 | |
| 8 | 32.29 | 14.36 | 1.552; 63.5 | |
| 9 | −40.94 | 0.84 | | |
| 10 | 48.32 | 10.72 | 1.518; 65.1 | |
| 11 | −126.80 | 0.84 | | |
| 12 | 47.65 | 10.72 | 1.518; 65.1 | |
| 13 | 214.59 | 45.34 | | Thickness = distance from last lens vertex to AP |
| 14 | ∞ | Projection surface | | collimated light bundle |

The optical system consists of two partial systems having positive power of refraction. The ratio of the powers of refraction determines the angular magnification of the deflected light bundle. The transformation optics are color-corrected for the wavelengths of the light bundles 113, 114 in the three primary colors of red, green and blue, and are suitable for color image representation.

The biaxially operating deflection device 112 is arranged in the entrance pupil EP (surface 1) at a distance of 40.936 mm in front of the lens vertex of the optical surface 2, which deflects the incident light bundle 113 in line direction and in image direction. A first stage of the transformation optics 109 is formed by the optical surfaces 2 to 7. Deflected light bundles 114 generate an intermediate image in an intermediate image plane ZBE, which is located between the first optical system and a second optical system. The second optical system is determined by the optical surfaces 7 to 13. Both optical systems are dimensioned such that an exit pupil AP (surface 14) of the total system is located 45.34 mm posterior to the last lens vertex (of the optical surface 13)—as seen in the direction of light propagation. At the location of the exit pupil AP, there is arranged the stop 111, whose diameter is selected to be such that none of the deflected light bundles 114 are trimmed. In the example, the incident light bundle 113 has a beam diameter of 5 mm, and the stop 111 has a clear diameter of 2.7 mm and an angle acceptance of the deflected light bundle of +/−10°.

Figure 6:
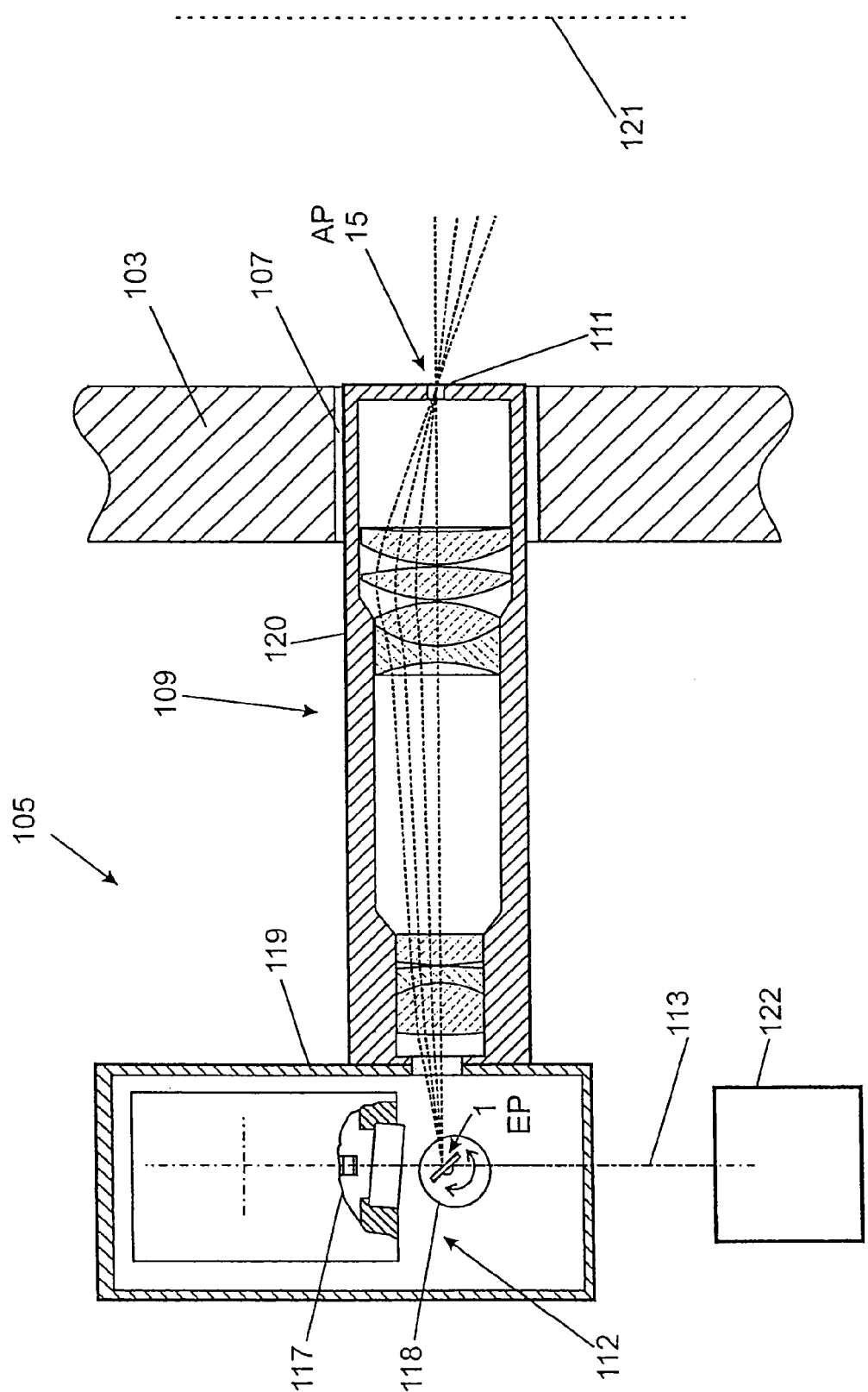
FIG. 6 shows a projector comprising transformation optics with an integrated stop according to the invention.

The correction factor is 1.08 here and takes into account the divergence of the light bundle as well as the fact that the entrance pupil EP in case of the biaxially operating deflection device 112, which consists of two deflection mirrors formed next to each other for each of the axes, can be located at exactly one site only on one of the mirrors or between the mirrors (see also FIG. 6).

The projection surface 121 is shown only schematically because it is arranged at a distance of several meters from the stop 111.

The described solution is only one of many possibilities to arrange the exit pupil AP between the last lens vertex 14 of the transformation optics 109 and the projection surface 121.

The described example requires comparatively little expenditure. However, further solutions, using several intermediate images, for example, are possible. One skilled in the art can calculate and manufacture alternative optical systems without difficulty, using his knowledge of the present invention and corresponding calculating programs.

Figure 4:
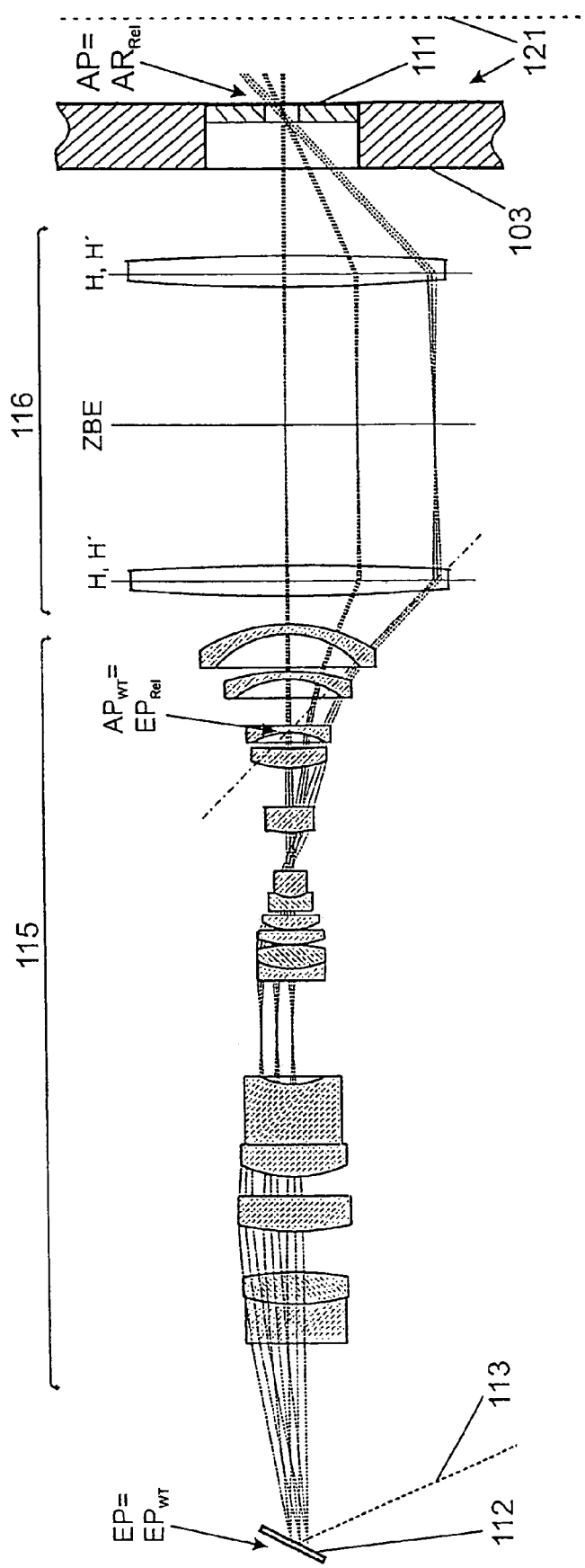
FIG. 4 shows optics for angle transformation according to the prior art with additional relay optics according to the invention.

FIG. 4 shows a further example of realizing the invention. According to the invention, relay optics 116 are associated here with angle transformation optics 115, known per se, which are corrected according to the tangential condition, e.g. according to DE 43 24 849 A1. Said relay optics 116 are arranged—as seen in the direction of light propagation—with respect to the angle transformation optics 115 such that the exit pupil $AP_{WT}$ of the angle transformation optics is equal to the entrance pupil $EP_{Rel}$ of the relay optics. In this case, these pupils are located at a site within the lenses of the angle transformation optics 115. The biaxial deflection device 112 is arranged at the site of the entrance pupil $EP_{WT}$ of the angle transformation optics 115.

The relay optics 116 serve the purpose of pupil transformation and are represented here only as a replacement system with its principal planes H and H'. The relay optics 116 shift the exit pupil $AP_{WT}$ of the angle transformation optics 115 to the site of the stop 111. In this example, the stop 111 is incorporated into the wall 103 which forms the projection surface 121.

The use of relay optics 116 for pupil transformation has the advantage that conventional angle transformation optics can be used for applications in a planetarium or a simulator without having the known disadvantages in image representation. It has been found that the imaging quality is deteriorated only to a negligible extent by the additional relay optics 116.

Figure 5:
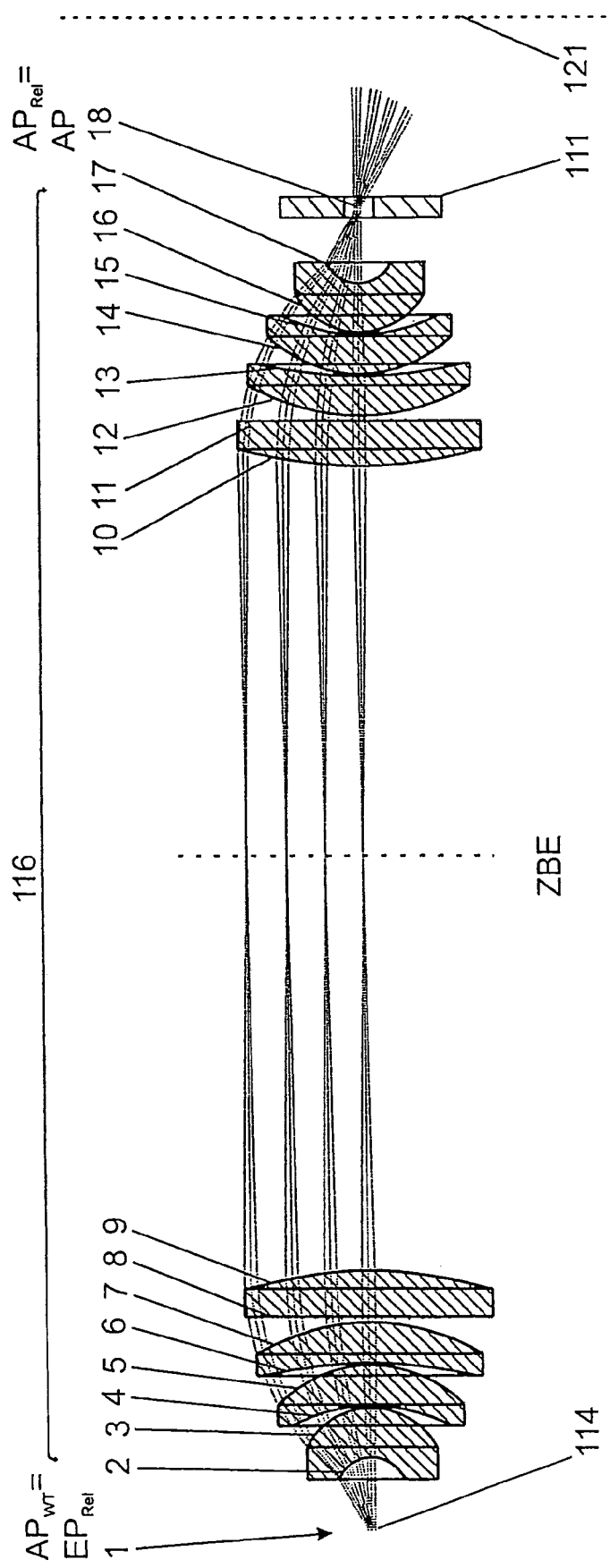
FIG. 5 shows a schematic view of relay optics.

FIG. 5 shows relay optics 116 which are calculated for a monochromatic light bundle. The angle acceptance of the relay optics is +/−30° at maximum, relative to the deflected light bundle 114. For image projection by means of laser radiation, the diameter of a collimated light bundle is typically within the range of from 1 mm to 10 mm. The entrance pupil $EP_{Rel}$ of the relay optics is located 32.73 mm in front of the first lens vertex 2 of the relay optics in this example. Precedingly arranged angle transformation optics, which are not shown, have their exit pupil $AP_{WT}$ at this site.

The following table provides the optical parameters:

| | | | Glass | | |
|---|---|---|---|---|---|
| Surface | Radius | Thickness | n | v | Remark |
| 1 | ∞ | 32.73 | | | Distance $AP_{WT}$ = $EP_{Rel}$ to 1st lens vertex of relay optics |
| 2 | −16.00 | 22.00 | 1.62 | 60.32 | |
| 3 | −33.22 | 1.00 | | | |
| 4 | −75.97 | 18.00 | 1.62 | 60.32 | |
| 5 | −58.21 | 1.00 | | | |
| 6 | −198.91 | 18.00 | 1.62 | 60.32 | |
| 7 | −97.14 | 1.00 | | | |
| 8 | 950.11 | 22.00 | 1.62 | 60.32 | |
| 9 | −194.00 | 367.58 | | | |
| 10 | 194.00 | 22.00 | 1.62 | 60.32 | |
| 11 | −950.11 | 1.00 | | | |
| 12 | 97.14 | 18.00 | 1.62 | 60.32 | |
| 13 | 198.91 | 1.00 | | | |
| 14 | 58.21 | 18.00 | 1.62 | 60.32 | |
| 15 | 75.97 | 1.00 | | | |
| 16 | 33.22 | 22.00 | 1.62 | 60.32 | |

-continued

| Surface | Radius | Thickness | Glass n | ν | Remark |
|---|---|---|---|---|---|
| 17 | 16.00 | 32.73 | | | Distance from last lens vertex to $AP_{Rel}$ = AP of total system |
| 18 | ∞ | | | | Projection surface collimated light bundle |

In this example, the exit pupil of the relay optics $AP_{Rel}$ is located 32.73 mm posterior to the last lens vertex of surface 17 of the relay optics 116. The stop 111 is arranged at this site. Since the amount of the angular magnification of the relay optics equals one, the diameter of the stop is several tenths of a millimeter lager than the diameter of the colinearly deflected light bundle 114.

FIG. 6 shows a further embodiment of the invention on a single projector, which is, for example part of the projection system according to FIG. 2. However, it can also be used as a stand-alone projector, if the advantage is to be employed that the light exit of the projection light from the projector should not be recognizable.

The biaxial deflection device 112 consists of a polygon scanner 117 and a galvanometer scanner 118. A housing of the deflection device 119 has a mechanical connection for a housing of the transformation optics. The entrance pupil EP of the transformation optics 109 is located close to the axis of rotation of the galvanometer scanner 118 in this case. The beam deflection of the polygon scanner is not effected in the entrance pupil, which leads to a beam deformation, i.e. an elliptic beam profile. Therefore, the stop is 1.2 times larger than the beam diameter of the incident light bundle 113, divided by the angular magnification of the transformation optics. In this case, the stop 111 is incorporated into a housing 120 of the transformation optics 109. The housing 120 is seated here in the breakthrough 107 and protrudes through the wall 103. However, such projector can also be placed at liberty in a room in which projection is effected, and then also has exactly the above-described advantages.

REFERENCE NUMERALS 1 to 18 optical surfaces
EP entrance pupil of the transformation optics
AP exit pupil of the transformation optics
ZBE intermediate image plane
$EP_{WT}$ entrance pupil of the angle transformation optics
$AP_{WT}$ exit pupil of the angle transformation optics
$EP_{Rel}$ entrance pupil of the relay optics
$AP_{Rel}$ exit pupil of the relay optics
101 projection dome
102 viewers' stand
103 wall
104 equatorial plane
105 projector
106 plane
107 breakthrough
108 viewer
109 transformation optics
110 principal projection beam
111 stop
112 biaxially operating deflection device
113 incident light bundle
114 deflected light bundles
115 angle transformation optics
116 relay optics
117 polygon scanner
118 galvanometer scanner
119 housing of the deflection device
120 housing of the transformation optics
121 projection surface
122 light source
123 electrical cables and optical light guide fiber connection

The invention claimed is:

1. An arrangement for projecting a color video image onto a projection surface, the image being composed of image points, said arrangement comprising:
at least one light source, which emits a light bundle and has a variable intensity;
a deflection device, which deflects the light bundle across the projection surface, and
two-stage transformation optics for angular magnification of said light bundle, which are arranged between the deflection device and the projection surface and comprise two partial systems having positive refractive power, wherein an entrance pupil of the transformation optics is located in front of a first lens vertex of the transformation optics, and an exit pupil of the transformation optics is located between a lens vertex of the last lens of the transformation optics and the projection surface, and a stop is arranged substantially coplanar with the exit pupil.

2. The arrangement as claimed in claim 1, wherein the stop has a clear dipineter, which corresponds to the product of a correction factor of between about 1 and about 1.5 and the result of a diameter of the incident light bundle, divided by said angular magnification of the transformation optics.

3. The arrangement as claimed in claim 1, further comprising a housing and wherein the stop is part of the housing of the transformation optics.

4. The arrangement as claimed in claim 2, further comprising a housing and wherein the stop is part of the housing of the transformation optics.

5. The arrangement as claimed in claim 1, wherein the stop is integrated into the surface of a wall and the transformation optics are positioned relative to said wall.

6. The arrangement as claimed in claim 2, wherein the stop is integrated into the surface of a wall and the transformation optics are positioned relative to said wall.

7. The arrangement as claimed in claim 5, wherein the wall comprises the projection surface.

8. The arrangement as claimed in claim 6, wherein the wall comprises the projection surface.

9. The arrangement as claimed in claim 1, wherein the transformation optics are corrected for imaging substantially free from distortion.

10. An optical system for transforming the angle of an incident light bundle, said system comprising:
two-stage transformation optics, comprising two partial systems having positive refractive power, arranged following each other, as seen in the direction of tight propagation;
wherein the ratio of the refractive powers of the partial systems determines the angular magnification of said incident light bundle; and
arrangement of lenses in the second partial system is selected such that, as seen in the direction of light propagation, an exit pupil of the transformation optics is located between a lens vertex of a last lens of the second partial system and the projection surface, and wherein a stop is arranged at the exit pupil.

11. The arrangement as claimed in claim 10, wherein the transformation optics are corrected for imaging substantially free from distortion.

12. An optical system for transforming the angle of an incident light bundle, said system comprising:

two-stage angle transformation optics, having a first exit pupil located within said transformation optics;

relay optics, comprising a first and a second partial system each having positive refractive power, arranged posterior to the angle transformation optics, as seen in the direction of light propagation;

wherein the relay optics comprises an entrance pupil that is equal to said first exit pupil and a second exit pupil and the arrangement of lenses in the second partial system is selected such that, as seen in the direction of light propagation, the second exit pupil is located between the lens vertex of a last lens of the relay optics and a projection surface, and wherein a stop is arranged at the exit pupil of the relay optics.

13. The optical system as claimed in claim 12, wherein the two-stage angle transformation optics are corrected for imaging substantially free from distortion.

* * * * *